(12) United States Patent
Jimenez Pino et al.

(10) Patent No.: US 11,705,818 B2
(45) Date of Patent: Jul. 18, 2023

(54) DC-DC TRANSFORMER FOR PLATFORMS HAVING 400V AND 800V VEHICLES

(71) Applicant: LEAR CORPORATION, Southfield, MI (US)

(72) Inventors: Rafael Jimenez Pino, Valls (ES); Pablo Gaona Rosanes, Valls (ES); Hector Sarnago Andia, Olvega (ES); Oscar Lucia Gil, Saragossa (ES)

(73) Assignee: LEAR CORPORATION, Southfield, MI (US)

( * ) Notice: Subject to any disclaimer, the term of this patent is extended or adjusted under 35 U.S.C. 154(b) by 81 days.

(21) Appl. No.: 17/502,441

(22) Filed: Oct. 15, 2021

(65) Prior Publication Data

US 2022/0173665 A1    Jun. 2, 2022

Related U.S. Application Data

(60) Provisional application No. 63/118,799, filed on Nov. 27, 2020.

(51) Int. Cl.
*H02M 3/335* (2006.01)
*H02M 3/325* (2006.01)

(52) U.S. Cl.
CPC ... *H02M 3/33573* (2021.05); *H02M 3/33584* (2013.01); *H02M 3/325* (2013.01)

(58) Field of Classification Search
CPC ............ H02M 3/325; H02M 3/33569; H02M 3/33573; H02M 3/337; H02M 3/33584
See application file for complete search history.

(56) References Cited

U.S. PATENT DOCUMENTS

| | | | | |
|---|---|---|---|---|
| 9,502,987 B1 * | 11/2016 | Feno | ............... | H02M 3/33546 |
| 9,866,130 B1 * | 1/2018 | Choi | ............... | H02M 3/33573 |
| 2011/0026276 A1 * | 2/2011 | Nakahori | ........... | H02M 1/4258 |
| | | | | 363/21.04 |
| 2014/0218973 A1 * | 8/2014 | Popovici | .......... | H02M 3/33573 |
| | | | | 363/17 |
| 2015/0207424 A1 * | 7/2015 | Okamoto | .............. | H02M 1/12 |
| | | | | 363/17 |
| 2016/0365793 A1 * | 12/2016 | Nakahori | ......... | H02M 3/33507 |
| 2019/0052167 A1 * | 2/2019 | Escudero Rodriguez | ................... |
| | | | | H02M 1/34 |

FOREIGN PATENT DOCUMENTS

DE       102015224437 B4 *  5/2019   ............... B60L 1/00

* cited by examiner

*Primary Examiner* — Gary A Nash
(74) *Attorney, Agent, or Firm* — Brooks Kushman P.C.

(57) ABSTRACT

A DC-DC converter includes a first switching network that receives the input DC voltage and outputs a first AC voltage, a transformer, and a secondary side conversion circuit that receives the second AC voltage and outputs the output DC voltage. The transformer includes a first plurality of primary windings, a second plurality of primary windings and a plurality of secondary windings. The transformer is configured to receive the first AC voltage and outputting a second AC voltage. When the input DC voltage is intended to be used in a low voltage range, the first plurality of primary windings and the second plurality of primary windings are configured to be in parallel at the time the DC-DC converter is manufactured. When the input DC voltage is intended to be used in a high voltage range the first plurality of primary windings and the second plurality of primary windings are configured to be in series at the time of manufacture.

13 Claims, 3 Drawing Sheets

DC-DC TRANSFORMER FOR PLATFORMS HAVING 400V AND 800V VEHICLES

CROSS-REFERENCE TO RELATED APPLICATIONS

This application claims the benefit of U.S. provisional application Ser. No. 63/118,799 filed Nov. 27, 2020, the disclosure of which is hereby incorporated in its entirety by reference herein.

TECHNICAL FIELD

In at least one aspect, a method and device for DC to DC conversion in an electric or hybrid electric vehicle is provided.

BACKGROUND

For future electrified vehicle architectures, OEMs are considering vehicles with HV architectures coexisting with two voltage levels, 400V and 800V, depending on the vehicle model.

Such designs can be a handicap for the present high voltage to low voltage DCDC converters because there is a broad input operating range (e.g., 230V to 820V) so typically design variants for 230 to 470V and 480 to 820V versions are developed to maximize product performance depending on HV architecture.

Accordingly, there is a need for DCDC converters from so different HV levels as similar as possible so that to minimize components costs through economies of scale.

SUMMARY

In at least one aspect, a DC-DC converter that applies a dual active bridge rectifier topology that converts an input DC voltage to an output DC voltage is provided. The DC-DC converter includes a first switching network that receives the input DC voltage and outputs a first AC voltage, a transformer, and a secondary side conversion circuit that receives the second AC voltage and outputs the output DC voltage. The transformer includes a first plurality of primary windings, a second plurality of primary windings and a plurality of secondary windings. The transformer is configured to receive the first AC voltage and outputting a second AC voltage. When the input DC voltage is intended to be used in a low voltage range, the first plurality of primary windings and the second plurality of primary windings are configured to be in parallel at the time the DC-DC converter is manufactured. When the input DC voltage is intended to be used in a high voltage range the first plurality of primary windings and the second plurality of primary windings are configured to be in series at the time of manufacture.

Advantageously, the direct current/direct current (DC/DC) converter system provided herein allow wide input voltage support with high performance through input voltage configurable selector, improved platform support, reuse of magnetic design, cost reduction and time to market, higher flexibility on design. Moreover, the converter system only requires the addition of a power switch operated at specific times with no energy flow (may be a relay or a silicon switch).

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein.

DETAILED DESCRIPTION

Figure 1A:
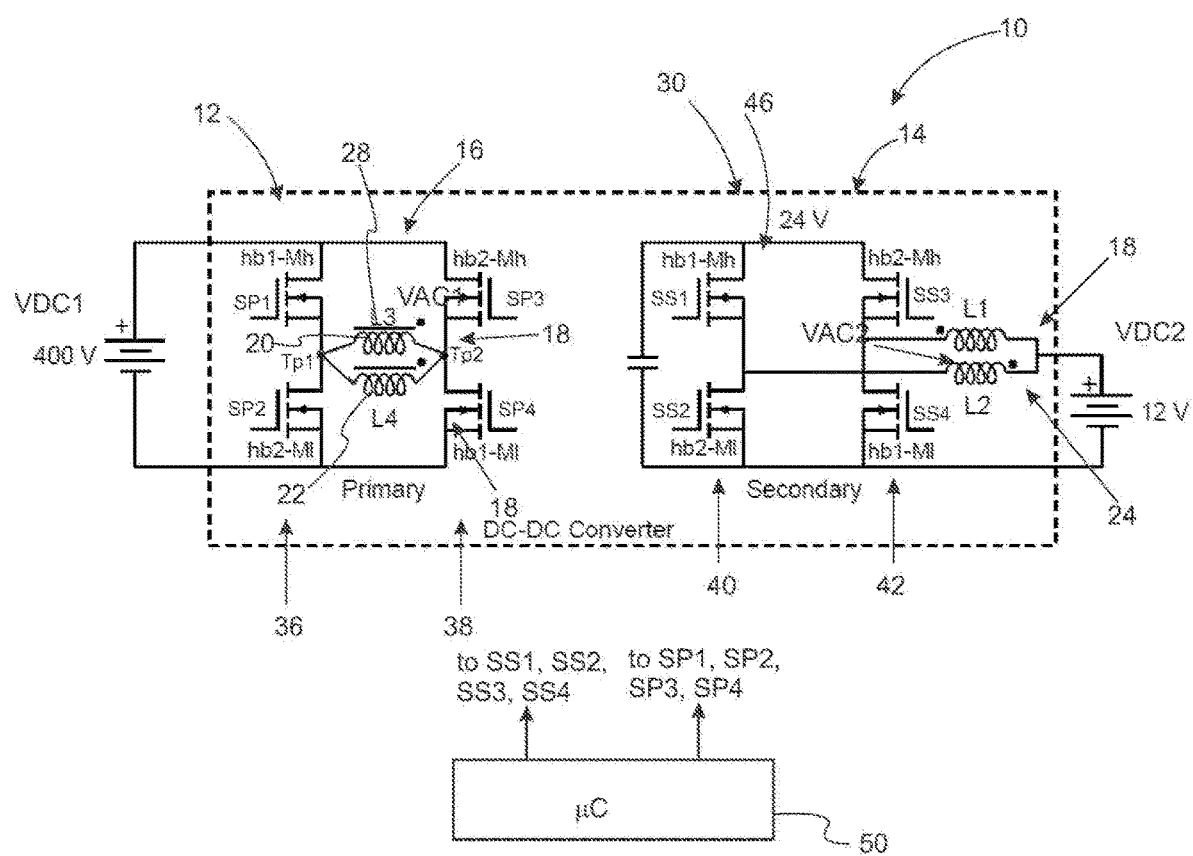
FIG. 1A Schematic diagram of DC-DC converter having a transformer in which the primary windings are configured in a parallel configuration.

Reference will now be made in detail to presently preferred embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

The term "connected to" means that the electrical components referred to as connected to are in electrical communication. In a refinement, "connected to" means that the electrical components referred to as connected to are directly wired to each other. In another refinement, "connected to" means that the electrical components communicate wirelessly or by a combination of wired and wirelessly connected components. In another refinement, "connected to" means that one or more additional electrical components are interposed between the electrical components referred to as connected to with an electrical signal from an originating component being processed (e.g., filtered, amplified, modulated, rectified, attenuated, summed, subtracted, etc.) before being received to the component connected thereto.

The term "electrical communication" means that an electrical signal is either directly or indirectly sent from an originating electronic device to a receiving electrical device. Indirect electrical communication can involve processing of the electrical signal, including but not limited to, filtering of the signal, amplification of the signal, rectification of the signal, modulation of the signal, attenuation of the signal, adding of the signal with another signal, subtracting the signal from another signal, subtracting another signal from the signal, and the like. Electrical communication can be accomplished with wired components, wirelessly connected components, or a combination thereof.

The term "electrical signal" refers to the electrical output from an electronic device or the electrical input to an electronic device. The electrical signal is characterized by voltage and/or current. The electrical signal can be a stationary signal or it can vary with respect to time.

The terms "DC signal" or "DC voltage" refer to electrical signals or electrical voltage that have voltage value that are always over 0 volts.

The terms "AC signal" or "AC voltage" refer to electrical signals or electrical voltage that have voltages varying between positive and negative voltages and crossing 0 volts The term "electronic component" refers is any physical entity in an electronic device or system used to affect electron states, electron flow, or the electric fields associated with the electrons. Examples of electronic components include, but are not limited to, capacitors, inductors, resistors, thyristors, diodes, transistors, etc. Electronic components can be passive or active.

The term "electronic device" or "system" refers to a physical entity formed from one or more electronic components to perform a predetermined function on an electrical signal.

It should be appreciated that in any figures for electronic devices, a series of electronic components connected by lines (e.g., wires) indicates that such electronic components are in electrical communication with each other. Moreover, when lines directed connect one electronic component to another, these electronic components can be connected to each other as defined above.

Abbreviations:
"AC" means alternating current.
"DAB" means a dual active bridge.
"DC" means direct current.
"DCDC" means direct current to direct current.
"HV/LV" means high voltage to low voltage.

In general, a DC/DC converter system includes primary side transformer has been doubled into two sets of windings, so that, depending on HV input voltage, this transformer is connected to power switches in two configurations. In this design, when in 400V voltage mode, the primary windings are connected in parallel, and when in 800V voltage mode, the primary windings are connected in series Referring now to FIGS. 1A, 1B, 1C, and 1D, schematics of a direct current/direct current (DC/DC) converter and transformer included therein are provided. In a refinement, DC/DC converter system 10 applies a dual active bridge rectifier topology that converts an input DC voltage to an output DC voltage. In a variation, DC/DC converter system 10 includes a primary stage 12 and a secondary stage 14. In this context, primary stage 12 and secondary stage 14 can also be referred to as primary side 12 and a secondary side 14. The primary stage 12 is configured to receive an input DC voltage VDC1 while the secondary stage is configured to output an output DC voltage VDC2. In a variation, a first switching network 16, which is part of the primary stage is configured to receive the input DC voltage and to convert the first DC voltage to a first AC voltage VAC1. Typically, the output DC voltage is less than the input DC voltage. In a variation, DC/DC converter system 10 is bidirectional.

As set forth below, first switching network 16 includes a plurality of semiconductor switches. In a refinement, the semiconductor switches are selected to have a lower relative electric current conducting capacity when the input DC voltage is intended to be used in said high voltage range. In another refinement, the semiconductor switches are selected to have a higher relative electric current conducting capacity when input DC voltage is intended to be used in said low voltage range.

DC/DC converter system 10 also includes a transformer 18 having a first plurality of primary windings 20 and a second plurality of primary windings 22. Similarly, transformer 18 also includes one or more pluralities of secondary windings 24. The primary side includes the first switching network 16, the first plurality of primary windings 20, and the second plurality of primary windings 22, the primary side configured to receive the input DC voltage VDC land provide a first AC voltage VAC1 across the first plurality of primary windings and the second plurality of primary windings. Characteristically, the transformer receives the first AC voltage VAC1 and outputs a second AC voltage VAC2. When the input DC voltage is intended to be used in a low voltage range, the first plurality of primary windings and the second plurality of primary windings are configured to be in parallel at the time the DC-DC converter is manufactured. In a refinement, the low voltage range is from 230 to 470 volts (i.e., 400 volt mode). When the input DC voltage is intended to be used in a high voltage range the first plurality of primary windings and the second plurality of primary windings are configured to be in series at the time of manufacture. In a refinement, the high voltage range is from 480 and 820 volts (i.e., 800 volt mode). Transformer 18 can also include core 28, and in particular, a magnetic core. The core 28 act to concentrate the magnetic fields with a gap between the primary and secondary winding providing electrical separation of the primary side from the secondary side. The reconfiguration of the first and second plurality of primary windings with the magnetics (that is, the transformer 18) preferably otherwise the same or substantially the same can provide a substantial cost benefit through allowing the use of a highly-common DC/DC converter system 10 among a high volume of vehicles.

Figure 1B:
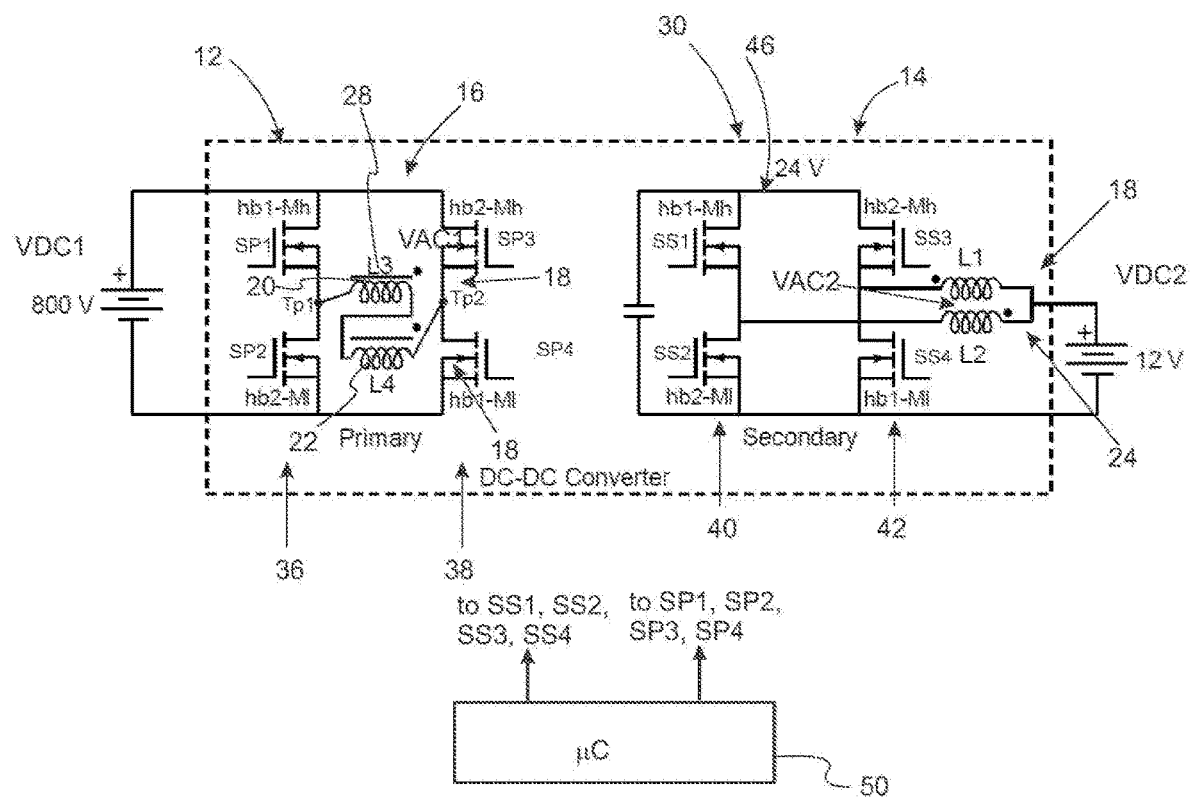
FIG. 1B Schematic diagram of DC-DC converter having a transformer in which the primary windings are configured in an in-series configuration.
Figure 1C:
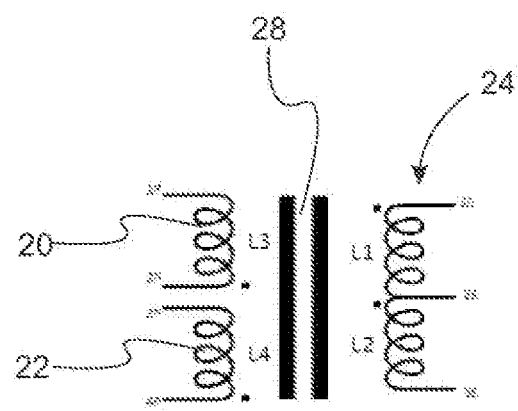
FIG. 1C Schematic diagram of a transformer used in the system of FIGS. 1A and 1B.

The dot in FIG. 1C provides indication of the sense of the windings in the coils (i.e., clockwise or counterclockwise). For example, coils having the dots on the top are wound in the same sense as compared to each other. Similarly coils having the dots on the bottom are wound in the same sense as compared to each other. A coil having a dot on the top is wound in the opposite sense to a coil having a dot at the bottom. Therefore, first plurality of primary windings 20, second plurality of primary windings 22 and each sub-coil (designated by L1 and L2) of second winding 24 are wound in the same sense.

DC/DC converter system 10 also includes a secondary side conversion circuit 30 that receives the second AC voltage VAC2 and outputs an output DC voltage VDC2.

In a refinement, the primary windings 20, 22 are part of the primary stage while the secondary windings are part of the secondary stage. The primary windings are in electrical communication with the first switching network 16 while the secondary windings are in electrical communication with the secondary side conversion circuit 30. In a refinement, when the primary stage receives the input DC voltage and the secondary stage outputs the output DC voltage, transformer 18 is configured to convert the first AC voltage VAC1 to a second AC voltage VAC2. In a refinement, the second AC voltage VAC2 is from about 15 volts to 30 volts peak to peak.

In another variation, when the secondary stage receives the input DC voltage and the secondary stage outputs the output DC voltage, transformer 18 is configured to convert second AC voltage VAC2 to first AC voltage VAC1.

Still referring to FIGS. 1A and 1B, the first switching network 16 can include a first H-bridge circuit. Therefore, the first switching network 16 includes switches SP1, SP2, SP3, and SP4. First switching network 16 includes a first H-bridge arm 36 and a second H-bridge arm 38. In the first H-bridge arm 36, the source of transistor switch SP1 is connected to a first input terminal Tp1 of primary windings 20 of transformer 18. The drain of transistor switch SP1 is VDC1, which is in electrical communication with the positive side of DC input voltage VDC1. The source of transistor switch SP1 is also connected to the drain of transistor switch SP2. Therefore, both the source of transistor switch SP1 and the drain of transistor switch SP2 are connected to the first input terminal Tp1 of primary windings 20, 22. The source of transistor switch SP2 is in electrical communication with the negative side of primary side voltage bus VPB1 and, therefore, the negative side of DC input voltage DCV1. Similarly, in the second H-bridge arm 38, the source of transistor switch SP3 is connected to a second input terminal Tp2 of primary windings 20, 22. The drain of transistor switch SP3 is connected to the positive side of DC input voltage VDC1. The source of transistor switch SP3 is also connected to the drain of transistor switch SP4. Therefore, both the source of transistor switch SP3 and the drain of transistor switch SP4 are connected to the second input terminal Tp2 of primary windings 20. The source of transistor switch SP4 is in electrical communication with the negative side of input voltage VDC1. During operation, when the primary stage receives the DC input VDC1, the first switching network 16 allows establishes the first AC voltage VAC1 that is applied to transformer 18 by creating positive and negative voltages that are alternatively applied to the transformer.

Switches SP1, SP2, SP3, and SP4 can be selected to have lower relative current-carrying capacities when the input DC voltage is intended to be used in the high voltage range and higher relative current-carrying capacities when the input DC voltage is intended to be used in the low voltage range. In that way, switches SP1, SP2, SP3, and SP4 and be selected to be sufficiently rated, but not over-rated, for the particular application. This can be particularly cost-effective. "Current-carrying capacity" is used here to refer to the current that can be conducted by the switches in their "ON" states.

Still referring to FIGS. 1A and 1B, the secondary side conversion circuit can include a second switching network. The present embodiment is not limited by the specific topology for the secondary stage. Typically, the secondary stage includes a second switching network configured to convert the second AC voltage VAC2 to the output voltage VDC2. FIG. 1A provides a specific example of such a topology that includes a second switching network 46 that is disclosed in U.S. Provisional Pat. No. 63/067,206 filed Aug. 18, 2020. Typically, the second switching network 46 can include a second H-bridge circuit. Therefore, second switching network 46 includes first H-bridge arm 40 and second H-bridge arm 42. First H-bridge arm 40 includes first transistor switch SS1 and second transistor switch SS2 while second H-bridge arm 42 includes a third transistor switch SS3 and a fourth transistor switch SS4.

In a variation, converter 10 further includes a microcontroller 50 configured to control the transistor switches in the first switching network 16 and the second switching network 30. In a refinement, microcontroller 50 can send control signals to the gates of transistor switches SP1, SP2, SP3, and SP4. In this regard, transistor switches SP1 and SP4 form a first primary side H-bridge arm and are simultaneously turned on and off by the control signal. Similarly, transistor switches SP2 and SP3 form a second primary side H-bridge arm on the primary side and are simultaneously turned on and off by the control signals. The first primary side H-bridge arm and the second primary side H-bridge arm are alternatingly actuated by the control signals. Therefore, the control signal for the first primary side H-bridge arm is (typically) 180° out of phase (typically) 180° with the second primary side H-bridge arm. This results in the voltage output of the first primary side H-bridge arm being out of phase with the output voltage of the second primary side H-bridge.

Microcontroller 50 can also send control signals to the gates of transistor switches SS1, SS2, SS3, and SP4. In this regard, transistor switches SS1 and SS4 form a first secondary side H-bridge arm and are simultaneously turned on and off by the control signal. Similarly, transistor switches SS2 and SS3 form a second secondary side H-bridge arm on the secondary side and are simultaneously turned on and off by the control signals. The first secondary side H-bridge arm and the second secondary side H-bridge arm are alternatingly actuated by the control signals. Therefore, the control signal for the first secondary side H-bridge arm is (typically) 180° out of phase (typically) 180° with the second secondary side H-bridge arm. This results in the voltage output of the first secondary side H-bridge arm being out of phase with the output voltage of the second secondary side H-bridge arm. Although the present invention is not limited by the type and frequency of the control signal, frequencies of about 20 to 120 kHZ can be used. The control signals can be square waves or any other suitable waveform.

The present invention is related to the converter of co-pending application < > which is incorporated by reference in its entirety herein.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A DC-DC converter that applies a dual active bridge rectifier topology that converts an input DC voltage to an output DC voltage, the DC-DC converter comprising:
 a first switching network that receives the input DC voltage;
 a transformer including a first plurality of primary windings and a second plurality of primary windings, wherein a primary side includes the first switching network, the first plurality of primary windings and the second plurality of primary windings, the primary side configured to receive the input DC voltage and provide a first AC voltage across the first plurality of primary windings and the second plurality of primary windings, the transformer outputting a second AC voltage; and
 a secondary side conversion circuit that receives the second AC voltage and outputs the output DC voltage,
 wherein when the input DC voltage is intended to be used in a low voltage range, the first plurality of primary windings and the second plurality of primary windings are configured to be in parallel at the time the DC-DC converter is manufactured and when the input DC voltage is intended to be used in a high voltage range the first plurality of primary windings and the second plurality of primary windings are configured to be in series at the time the DC-DC converter is manufactured.

2. The DC-DC converter of claim 1, wherein the low voltage range is from 230 to 470 volts and the high voltage range is from 480 and 820 volts.

3. The DC-DC converter of claim 1, wherein when the input DC voltage is about 400 volts, the first plurality of primary windings and the second plurality of primary windings are configured to be in parallel at the time the DC-DC converter is manufactured.

4. The DC-DC converter of claim 1, wherein when the input DC voltage is about 800 volts, the first plurality of primary windings and the second plurality of primary windings are configured to be in series at the time the DC-DC converter is manufactured.

5. The DC-DC converter of claim 1, wherein the primary side includes the first switching network, first plurality of primary windings and the second plurality of primary windings and a secondary side includes a plurality of secondary windings and the secondary side conversion circuit.

6. The DC-DC converter of claim 1, wherein the first switching network includes a first H-bridge circuit.

7. The DC-DC converter of claim 1, wherein the secondary side conversion circuit includes a second switching network.

8. The DC-DC converter of claim 7, wherein the second switching network is a second H-bridge circuit.

9. The DC-DC converter of claim 1, further comprising a microcontroller configured to control the first switching network.

10. The DC-DC converter of claim 9, wherein the microcontroller is further configured to control a second switching network in a secondary stage.

11. The DC-DC converter of claim 1, wherein the output DC voltage is less than the input DC voltage.

12. The DC-DC converter of claim 1, wherein the DC-DC converter is bidirectional.

13. The DC-DC converter of claim 1, wherein:
 the first switching network comprises a plurality of semiconductor switches;
 the semiconductor switches are selected to have a lower relative electric current conducting capacity when the input DC voltage is intended to be used in said high voltage range; and
 the semiconductor switches are selected to have a higher relative electric current conducting capacity when input DC voltage is intended to be used in said low voltage range.

* * * * *